United States Patent [19]

Takao

[11] Patent Number: 4,960,197
[45] Date of Patent: Oct. 2, 1990

[54] FINGER ACTUATING DEVICE IN A TRANSFER PRESS

[75] Inventor: Hiromichi Takao, Seto, Japan

[73] Assignee: Asahi-Sieki Manufacturing Co., Ltd., Japan

[21] Appl. No.: 322,163

[22] Filed: Mar. 13, 1989

[30] Foreign Application Priority Data

Mar. 16, 1988 [JP] Japan .............................. 63-35055[U]

[51] Int. Cl.$^5$ ............................................ B65G 25/00
[52] U.S. Cl. ....................................... 198/621; 72/405
[58] Field of Search ............... 198/621, 773, 774, 775; 414/750, 751, 736; 72/405, 421

[56] References Cited

U.S. PATENT DOCUMENTS

| | | | |
|---|---|---|---|
| 2,929,485 | 3/1960 | Wallis | 198/621 X |
| 2,934,194 | 4/1960 | Adams | 198/621 X |
| 3,620,381 | 11/1971 | McCaughey | 198/621 X |
| 3,655,070 | 4/1972 | Haydu | 414/618 |
| 3,757,961 | 9/1973 | Jacobs | 198/621 |
| 3,939,992 | 2/1976 | Mikulec | 198/621 X |
| 4,273,507 | 6/1981 | Herdzina et al. | 198/621 X |
| 4,373,370 | 2/1983 | Allen et al. | 198/621 X |
| 4,404,837 | 9/1983 | Allen et al. | 198/621 X |
| 4,735,303 | 4/1988 | Wallis . | |
| 4,750,348 | 6/1988 | Hennah . | |
| 4,833,908 | 5/1987 | Sofy | 198/621 X |

FOREIGN PATENT DOCUMENTS

58-212507  12/1983  Japan .
62-16829   1/1987  Japan .

Primary Examiner—Joseph E. Valenza
Assistant Examiner—D. Glenn Dayoan
Attorney, Agent, or Firm—Oliff & Berridge

[57] ABSTRACT

A finger actuating device in a transfer press in which workpieces are successively transferred from one station to the next station, thus completing a finished part is disclosed and includes transfer slides adapted to make a reciprocating movement over a distance between processing stations, a plurality of pairs of fingers arranged on the transfer slides at intervals corresponding to the distances between processing stations and actuating bars on which finger actuating cams for controlling the opening/closing action of the fingers are mounted and which move relatively to the transfer slides, the mounting position of the finger actuating cams relative to the actuating bars being adjustable. By use of this invention, an optimum finger actuating timing can be adjusted in accordance with the workpiece height or the drawing depth, which varies from step to step.

1 Claim, 9 Drawing Sheets

FINGER ACTUATING DEVICE IN A TRANSFER PRESS

BACKGROUND OF THE INVENTION

1. FIELD OF THE INVENTION

This invention relates to a finger actuating device in a transfer press in which workpieces to be processed are successively transferred from a station to the adjacent one, thus completing a finished part.

2. DESCRIPTION OF THE PRIOR ART

The opening/closing action of fingers in a conventional transfer press is performed through hammering motion of a spreader mounted on an upper punch block or on a movable stripper. This hammering motion, however, involves a number of problems. Certain improvements contrived in this regard are disclosed in Japanese Patent Laid-Open Nos. 58-212507 and 62-16829.

In the device disclosed in Japanese Patent Laid-Open No. 58-212507, engaging fingers and transfer slides are driven by a drum cam, so it is impossible to adjust the relative timing of their movements. Further, since the operating condition of each engaging finger actuated by the drum cam cannot be adjusted, each finger opening/closing timing cannot be adjusted relating the movement of the transfer slides. Furthermore, since the direction of movement of the actuating bars is perpendicular to the finger opening/closing direction, it will be seen that it is difficult to get a larger stroke. If a larger stroke is needed, the width of the transfer slides must be enlarged. In addition, since the opening and closing movement of the fingers is effected by means of straight linear cams, ideal movement characteristics cannot be obtained. As for the device disclosed in Japanese Patent Laid-Open No. 62-16829, the crank arm operating the fingers is fixed to a rod with key, so the actuating timing adjustment thereof is not possible. Accordingly, the finger actuating timing of each station cannot be adjusted relating the movement of the transfer slides. As a result, it is not possible in the device disclosed to establish an optimum workpiece engaging condition of the finger tools related to the drawing action performed by a punch and the movement of the transfer slides.

Figure 1:
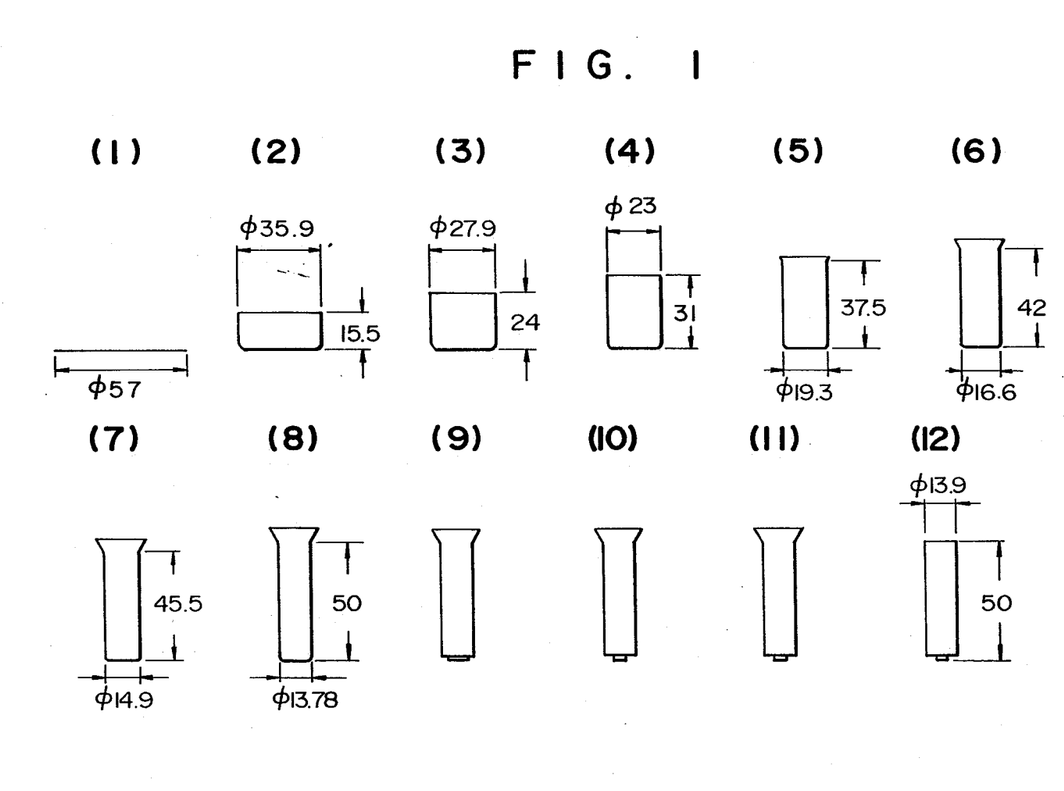
FIG. 1 shows a drawing process layout of UM-3 type battery case successively produced by a transfer press with multi-stations.

By way of example, FIG. 1 shows a drawing process layout, a UM-3 type battery case in this case, on a transfer press. In the example shown, the first drawn height is 15.5 mm, the final one being 50 mm and there exists a difference of 34.5 mm between the first and the final drawn height. It will be seen that each drawing punch should have different length in accordance with the height of each workpiece at each processing station. This implies that the time when the punch strikes the bottom of the workpiece transferred on the common transfer level (die level) differs each other. Workpieces are drawn into the dies by the action of the corresponding punches, and are pushed out by knockout tools up to the die level, i.e., the transfer level, the bottoms of the workpieces being on the same level. Since the workpieces have individual different height, the time when they have been lifted up onto the transfer level to be transferred differs at each station.

Consequently, if the opening/closing time of the finger tools is the same throughout all the stations, shorter workpieces have to remain for a certain period without being held until the taller ones have been engaged by the fingers. This requires other provisions to hold workpieces. The best condition is that the fingers are opened when the lower end of the punch has drawn a workpiece by several mm into the die, and are closed when the bottom of the processed workpiece has been lifted up to the transfer level by the knockout tool.

In view of the characteristic in the transfer process described above, it is desirable that the finger actuating timing can be individually adjustable at the best condition in accordance with the height of each workpiece at each station.

SUMMARY OF THE INVENTION

This invention aims at eliminating the above-mentioned problems encountered in conventional transfer press machines. It is accordingly an object of this invention to provide a finger actuating device in a transfer press in which an optimum timing adjustment at each station can be realized for the relative movement of the press or drawing operation, the transfer movement and the workpiece engaging action by the finger tools.

To attain the above object, the present invention provides a finger actuating device in a transfer press in which workpieces to be processed are successively transferred from a station to the adjacent one, thus completing a finished part, comprising: a pair of transfer slides which include respective guide ways positioned longitudinally and are arranged substantially parallel to each other; a transfer slide driving means to make an intermittent reciprocating movement of said transfer slides in the longitudinal direction; a pair of actuating bars supported on said pair of transfer slides in such a manner as to be movable along said guide ways; an actuating bar driving means adapted to move said actuating bars in such a manner that they move synchronously with said transfer slides and that they move longitudinally and relatively to said transfer slides when they dwell; a plurality of pairs of finger members having respective finger tools for holding workpieces to be processed and arranged opposite to each other on said transfer slides at intervals corresponding to the distances between said processing stations so as to perform opening/closing-operation for releasing and engaging the workpieces to be processed with said finger tools; spring loaded members adapted to urge said finger members normally in the closing direction; and a plurality of finger actuating cams having rises individually contoured and arranged on said actuating bars at intervals nearly corresponding to the distances between said processing stations in such a manner as to be longitudinally adjustable and to be able to operationally engage with said finger members and adapted to move said finger members in the opening or closing direction as said actuating bars move relative to said transfer slides.

The objects, construction, and advantages of the present invention will become more apparent from the following description of preferred embodiments which is made with reference to the accompanying drawings.

DESCRIPTION OF THE PREFERRED EMBODIMENTS

Figure 2:
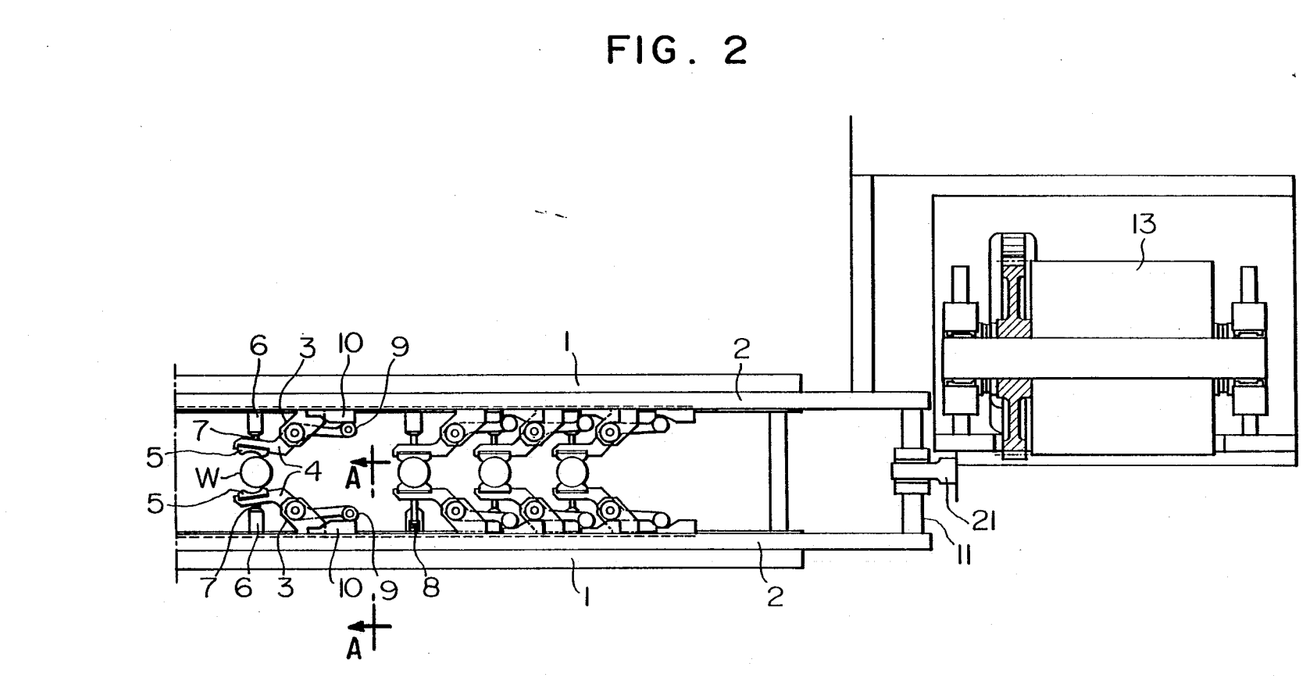
FIGS. 2 and 3 are a plan view and a side view, respectively, of an embodiment of a finger actuating device in accordance with this invention.
Figure 2A:
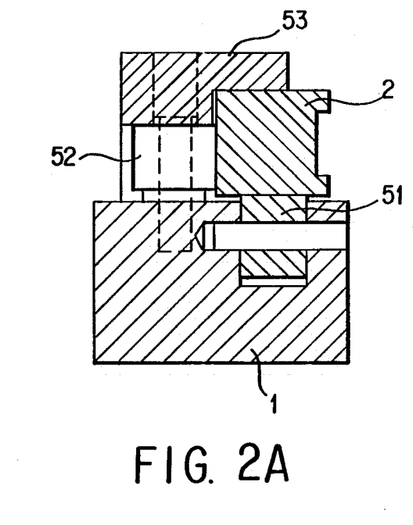
FIG. 2a is a sectional view taken along line A—A of FIG. 2.
Figure 3:
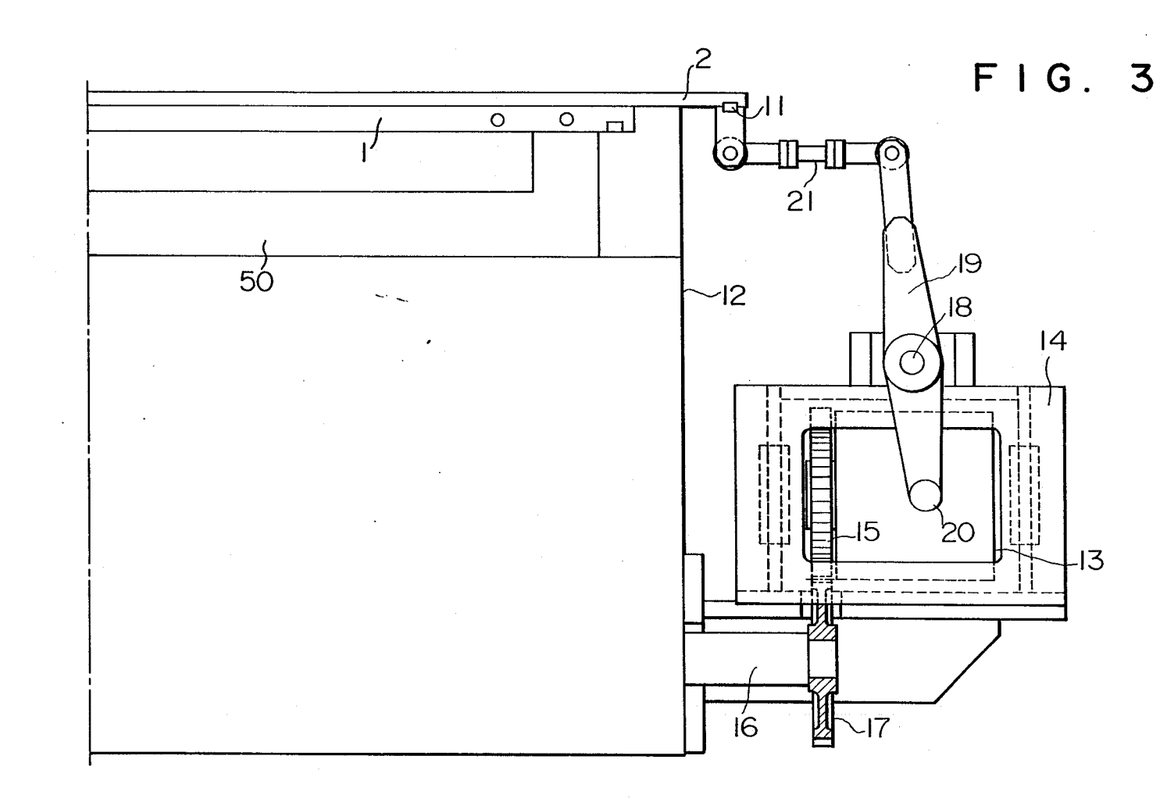
Figure 8:
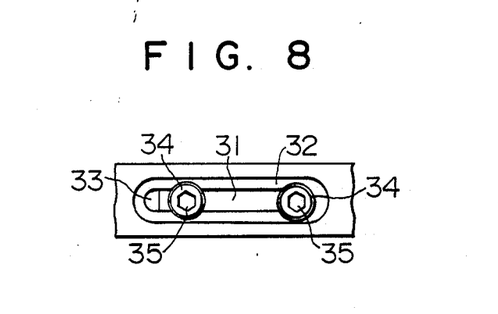
FIG. 8 is a side view of a part of the embodiment of FIG. 5 as seen in the direction indicated by the line IIX—IIX.

An embodiment of a finger actuating device in accordance with this invention will now be described with reference to FIGS. 2 and 3. The transfer press with this actuating device is of the well-known type in which workpieces are successively produced on equally spaced multi-stations. A pair of parallel transfer slides 1, arranged on a die bed 50 on the frame 12 of the transfer press, extend over all the stations and are reciprocated intermittently by the distance between stations on a scheduled timing in the longitudinal direction by a driving means (not shown). Guide ways are longitudinally positioned on each of the transfer slides. Each actuating bar 2 is supported in such a manner as to be longitudinally movable along a respective guide way which consists of rollers 51 and 52 and a sliding guide 53 as shown in FIG. 2a. A pair of brackets 3 extends under the actuating bar 2 from the inner sides of the transfer slides 1. Finger members 4 are pivoted at nearly middle positions thereof to these brackets 3 with vertical pins. The finger members 4 are arranged in pairs and opposed to each other. Finger tools 5 with semi-circular jaws to hold the workpieces are secured to the opposite surfaces of the finger members 4 and are made of a soft material such as a soft metal, a plastic or rubber so that workpieces may not be harmed. The pairs of the finger members 4 are normally closed by pressure pins 7 which are slidably guided in respective holders 6 secured to the transfer slides 1 at the backside of the finger tools 5. That is, the pressure pins 7 are urged by respective springs 8 provided in the respective holders 6 in such a manner as to push the back side of the finger members 4. Further, each finger member 4 is provided with a roller 9 pivoted on the opposite end of each finger tool 5. Actuating bars 2 are provided with longitudinally adjustable finger actuating cams 10 contacting with the respective roller 9 of the finger members 4. A suitable cam adjustment means is shown in FIG. 8 and specifically described in connection with the second embodiment of the invention. When the actuating bars 2 move to the left with respect to the transfer slides 1, as seen in FIG. 2, the rollers 9 of the finger members 4 rise along the contour of the cams 10, thus opening the finger tools 5. On the other hand, when the actuating bars 2 move to the right, the rollers 9 fall down on the low surfaces of the cams 10. The contour of the camrise may be designed individually depending on the size of workpieces.

A required sets of these pairs of finger members 4, finger actuating cams 10 and pressure pins 7 are so arranged at intervals corresponding to the distance between stations that the distance between adjacent workpieces engaged agree with those of the punches.

Figure 4:
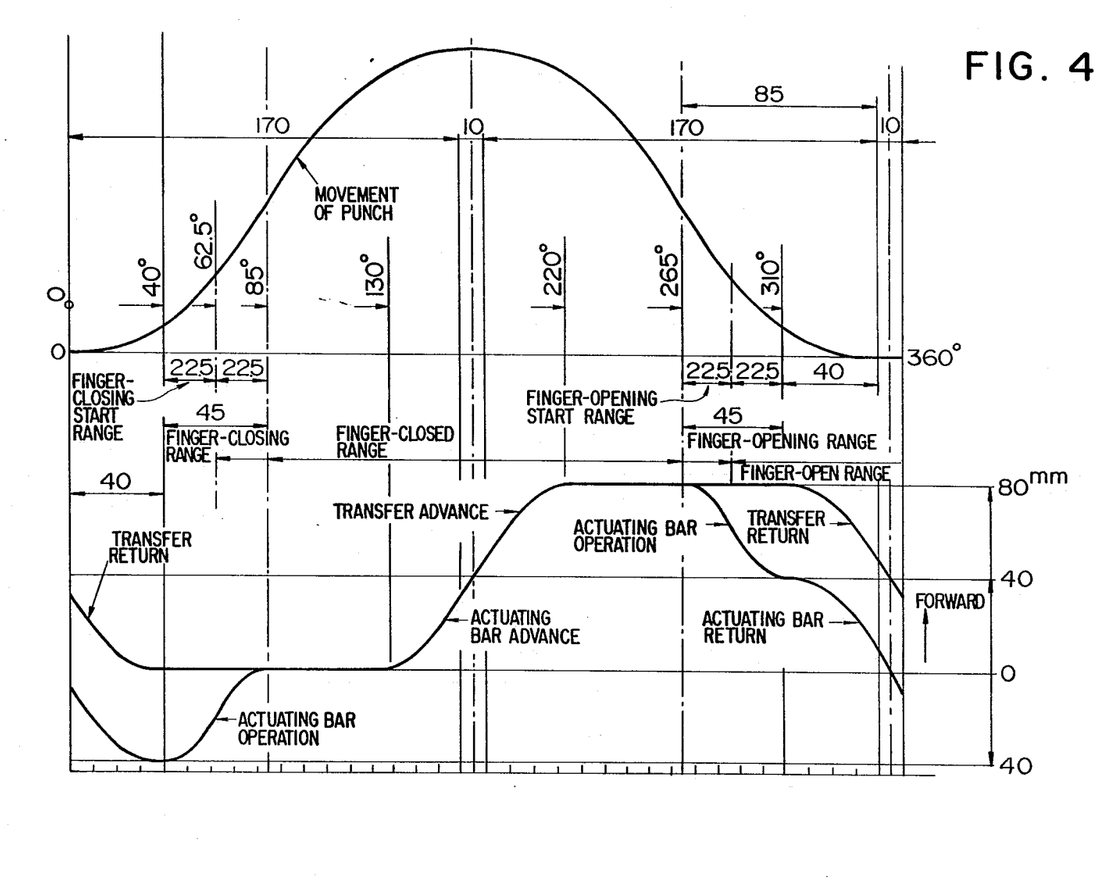
FIG. 4 is a timing diagram showing the operational relationship between transfer slides, actuating bars and punches.
Figure 5:
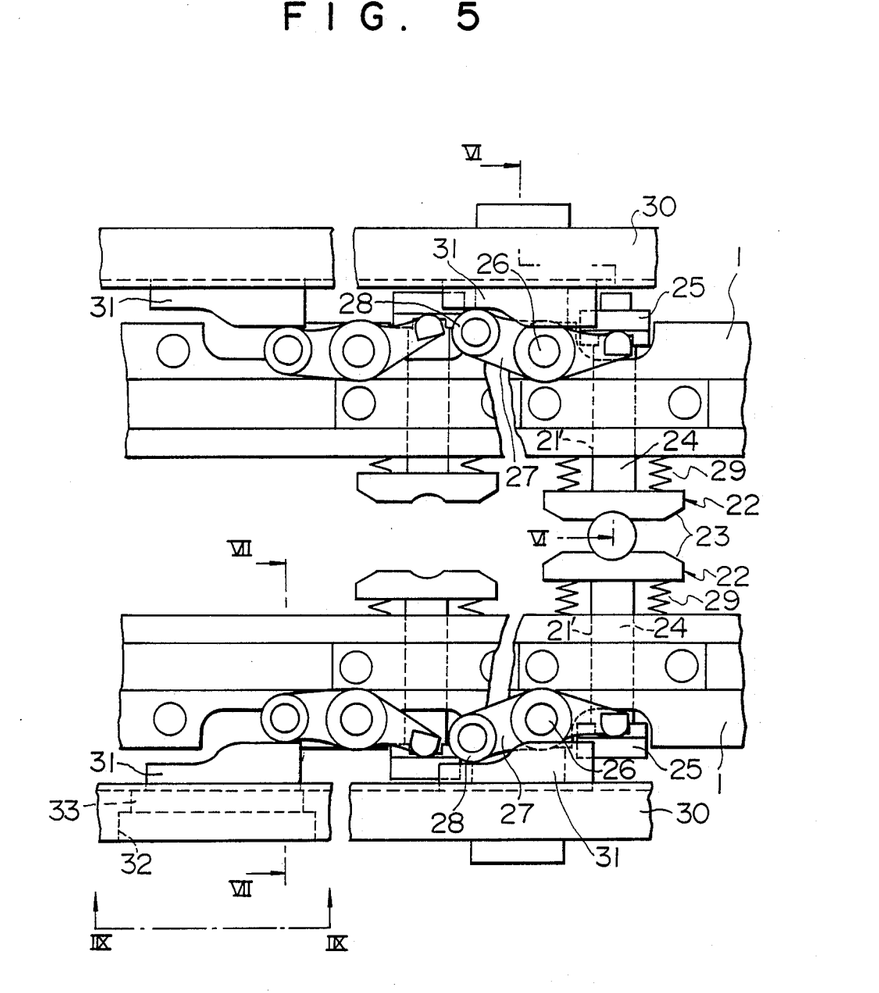
FIG. 5 is a plan view of a second embodiment of this invention.
Figure 6:
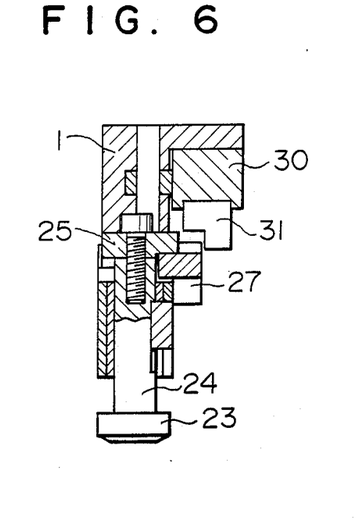
FIG. 6 is a sectional view taken along the line VI—VI of FIG. 5.
Figure 7:
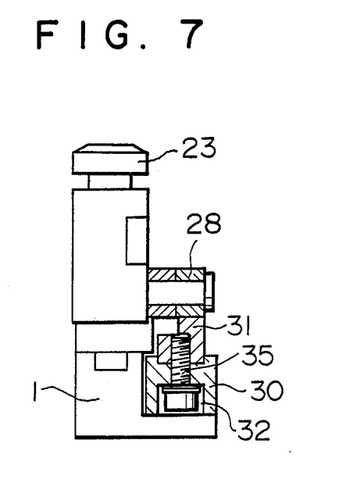
FIG. 7 is a sectional view taken along the line VII—VII of FIG. 5.

The pair of the actuating bars 2 is connected to each other at their end by a connecting bar 11. Further, a housing 14, in which a drum cam 13 is rotatably arranged on a horizontal shaft, is attached to a bracket bolted on the side of the frame 12 of the transfer press. A gear 15 positioned at one end of the drum cam 13 is engaged with a gear 17 fixed to one end of an under drive shaft 16. On the top of the housing 14 a horizontal supporting shaft 18 is provided, on which a lever 19 is rotatably pivoted. A cam follower 20 at the lower end of the lever 19 is engaged with the groove of the drum cam 13, the upper end of the lever 19 being linked with the connecting bar 11 through a connecting rod 21. The operational timing of the finger actuating cams 10 is shown in FIG. 4. In addition to this, a finer timing adjustment can be achieved at each process station in accordance with the workpiece forming conditions therefor.

In FIG. 4, supposing the bottom dead point after completing the drawing operation corresponds to 0° of the machine cycle. The transfer slides 1 continue to return until they reach the original position, which corresponds to 40° of the machine cycle. At this point, the actuating bars 2 are shifted further in the return direction than the transfer slides 1 as a result of the rotation of the drum cam 13. At the position of 40° rotation of the machine cycle, the actuating bars 2 are shifted back from the original position by a distance corresponding to one half of the transfer stroke. The transfer stroke being 80 mm in this example, the above-mentioned distance is 40 mm. In the meantime, the transfer slides 1 and the actuating bars 2 have shifted in position relative to each other, the rollers 9 of the finger members 4 rising on the top contour of the finger actuating cams 10 to push back the pressure pins 7 into the holders 6 against the force of the springs 8, thus opening the finger tools 5. Now punches have already started to rise with workpieces. The transfer slides 1 dwell at the original position until they reach the position of 130°, in this example, by a cam drive means (not shown) which operates in synchronization with the movement of the punches. The actuating bars 2, on the other hand, start to advance at the position of 40° by the rotation of the drum cam 13, and they return to the original position at 85° in this example. Afterwards, they dwell together with the transfer slides 1 until they reach 130° position. When the actuating bars 2 move from 40° to 85° position relative to the transfer slides 1, the rollers 9 of the finger members 4 fall down along the contour to the low surfaces of the finger actuating cams 10, the finger members 4 being pushed by the pressure pins 7, which causes the finger tools 5 to grip the workpieces W at the forming positions. Specifically the position of the finger actuating cams 10 is adjusted such that during 22.5° which is the first half of 45° interval from 40° to 85°, the closing action of finger members 4 starts and during the second half of the above-mentioned 45° interval, the closing action of finger members 4 is completed. Ideally at the time of completion of the closing action, the workpiece is lifted up with a knockout to a level at which its bottom is located at the transfer level. In this manner the position of the finger actuating cams 10 is precisely adjusted to obtain optimum timing according to the condition of the drawing process. In the interval between 85° and 130°, the transfer slides 1 and the actuating bars 2 are at the dwell, while the punches continue to rise. In the interval between 130° and 220°, the transfer slides 1 advance from the original position by the transfer stroke of 80 mm, and simultaneously the actuating bars 2 advance together with the transfer slides 1 by the rotation of the drum cam 13, thus transferring the workpieces from one to the next processing stations. The press passes through the top dead point during the transfer. In the interval between 220° and 265°, the transfer slides 1 and the actuating bars 2 remain at the dwell, while the punch continue to descend.

In the 45° interval between 265° and 310°, the transfer slides 1 are at the dwell, while the actuating bars 2 start to return by the rotation of the drum cam 13 and they shift by 40 mm, which corresponds to one half of the transfer stroke. This causes the rollers 9 of the finger members 4 to rise along the contour of the finger actuating cams 10, the finger tools 5 being opened against the force of the pressure pins 7. Specifically during 22.5° which is the first half of the above-mentioned 45° interval, the opening action of finger members 4 starts. The ideal starting time is the time when the lower end of the punch strikes the workpiece as transferred and has drawn the workpiece by several mm into the die. During the second half interval, the opening action of finger members 4 is completed. The camrise of the finger actuating cam 10 is so designed as to obtain the almost ideal timing of closing/opening action of finger members and the cam 10 thus designed is fixed to the actuating bar 2 at a position at which the almost ideal timing is obtained, while considering the finger actuating timing. In addition, the actuating timing of individual finger members is gradually advanced or delayed in accordance with the drawing process layout. If the height of a workpiece is 50 mm, the punch will begin to insert the workpiece into the corresponding die at 275° position. The start of opening of the finger tools 5 is so adjusted that the workpieces remain gripped until these have been inserted several mm into the dies. The punch draws the workpiece during the period of 275° to 350°. The transfer slides 1 return during the period of 310° to 400° and the actuating bars 2 also return simultaneously with 40 mm shifted position relative to the transfer slides 1 by the rotation of the drum cam 13.

A rack-pinion mechanism may be provided between the connecting bar 11 and the lever 19, instead of the connecting rod 21.

Next, a second embodiment of a finger actuating device in accordance with this invention will be described with reference to FIGS. 5, 6, 7 and 8. The embodiment shown comprises a pair of opposed transfer slides 1 which include a plurality of transverse holes 21' arranged at intervals corresponding to the distances between the adjacent processing stations. This embodiment includes opposed finger members 22, arranged in pairs, each pair comprising finger tools 23, shafts 24 which extend behind the finger tools 23 and through the above-mentioned holes 21' of the transfer slides, and engagement members 25, 25 attached to the respective rear ends of the shafts 24. At the outer position of the transfer slides 1 levers 27 are pivoted at the respective middle portion to the transfer slides with vertical pins 26. One end of each lever 27 engages at the inside with the corresponding engagement member 25. A roller 28 is attached to the other end of each lever 27. The finger members 22 are normally urged in the closing direction by springs 29, i.e., such that the finger tools 23 grip workpieces to be processed. This embodiment further includes actuating bars 30 which are arranged outside the transfer slides 1 in such a manner as to be longitudinally movable. Finger actuating cams 31 are mounted on the respective inner sides of the actuating bars 30 and engage with the rollers 28 of the levers 27. As clearly shown in FIG. 8, each of the actuating bars 30 has on its outer side surface longitudinally elongated grooves 32 arranged at required intervals. Provided at the bottom of each elongated groove 32 is a slot 33, into which bolts 35 are inserted to be screwed into the finger actuating cam 31 through washers 34, thereby fixing the finger actuating cam 31 to the actuating bar 30. The longitudinal position of the finger actuating cam 31 relative to the actuating bar 30 can be adjusted by loosening the bolts 35.

When, in this embodiment, the actuating bars 30 move relative to the transfer slides 1 and the rollers 28 of the levers 27 rise along the contour of the cams 31, the finger members 22 are opened against the force of the springs 29, thus releasing the workpieces to be processed. When the rollers 28 fall down to the low surfaces of the cams 31, the finger members 22 close as they are pushed by the springs 29 to grip the workpieces. The finger actuating timing can be adjusted by loosening the bolts 35 and shifting the position of the cams 31 relative to the actuating bars 30 for each process station. The stroke of fingers in opening/closing action can be altered by changing the contour of the rise of their associated actuating cams.

Figure 9:
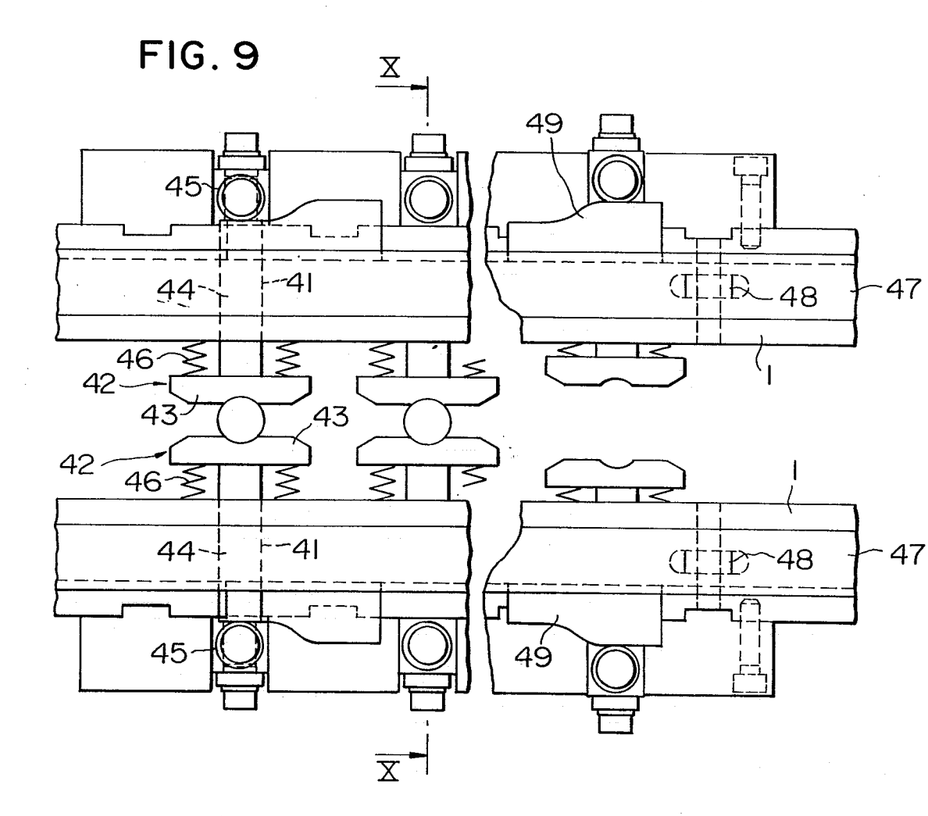
FIG. 9 is a plan view of a third embodiment of this invention.
Figure 10:
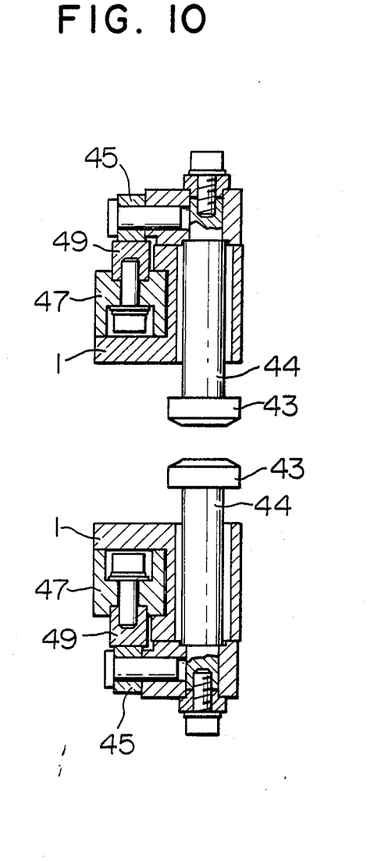
FIG. 10 is a sectional view taken along the line X—X of FIG. 9.

FIGS. 9 and 10 show a third embodiment of this invention. As in the second embodiment, the transfer slides 1 of this embodiment include a plurality of transverse holes 41 arranged at intervals corresponding to the distances between adjacent processing stations. As in the above-described embodiments, this embodiment includes opposed sets of finger members 42, each of which comprises a finger tool 43, a shaft 44 extending behind the finger tool 43 and through the above-mentioned transverse hole 41, and a roller 45 attached to the rear end of the shaft 44. The finger members 42 are normally urged in the closing direction by respective springs 46. Actuating bars 47 move along the respective guide ways with rollers 48 provided on the transfer slides 1. Finger actuating cams 49 are mounted on the respective outer sides of the actuating bars 47 in the same manner as described with respect to FIG. 8 or the like such as to be longitudinally adjustable relative to the actuating bars 47. In this embodiment, the finger actuating cams 49 engage with the rollers 45 which are directly attached to the finger members 42. When the actuating bars 47 move relative to the transfer slides 1, the rollers 45 are guided along the contour of the cams 49, thereby opening or closing the finger members 42. The finger actuating mechanism of this embodiment is more advantageous than that of the second embodiment in that it requires fewer parts.

As described above in detail, according to the present invention, the mounting position of the finger actuating cams can be adjusted and the rise of each finger actuating cam can be altered and thus it is possible to individually perform an optimum adjustment of the finger tool actuating timing, relating the transfer timing in accordance with the processing conditions at each process station such as workpiece height and diameter or drawing depth. Furthermore, since only the finger actuating cams are mounted on the actuating bars, the mass of the mechanism is very light and high speed operation can be achieved through the synergy of the finger actuating mechanism with light mass and applying the moving characteristics with continuous acceleration such as modified sine curve to the drum cam. In addition, since hammering motion does not occur when fingers actuate the device of this invention provides a steady and smooth operation. Furthermore, since larger finger strokes can be set in accordance with this invention, it is not necessary to enlarge the device size in the transverse direction as in conventional devices, thus providing a more compact device.

What is claimed is:

1. A finger actuating device in a transfer press, in which workpieces to be processed are successively transferred through a plurality of stations disposed at predetermined intervals, comprising:

a pair of transfer slides extending substantially in parallel to each other and arranged to make an intermittent reciprocating movement in the longitudinal direction;

guide ways positioned longitudinally on said transfer slides, respectively;

a pair of actuating bars supported on said pair of transfer slides in such a manner as to be movable along said guide ways;

an actuating bar driving means adapted to move said actuating bars in such a manner that said actuating bars move synchronously with said transfer slides and that said actuating bars move longitudinally and relative to said transfer slides when said transfer slides dwell;

a plurality of pairs of finger members having respective finger tools for holding workpieces to be processed and arranged opposite to each other on said transfer slides at intervals corresponding to said predetermined intervals between said stations so as to perform opening/closing operation of said finger tools for releasing and engaging the workpieces to be processed with said finger tools, each of said finger members consisting of a lever member which has a middle portion pivoted to one of said transfer slides by means of a vertical pin and has at one end thereof said finger tool and at the other end thereof a roller;

spring loaded members adapted to urge said finger members normally to perform the closing operation of said finger tools; and a plurality of finger actuating cams having rises individually contoured and arranged on said actuating bars at intervals substantially equal to those between said stations in such a manner that the longitudinal position of each said cam relative to said actuating bar is adjustable and that said cams are adapted to engage with said associated rollers of said finger members to perform the opening operation of said finger tools as said actuating bars move relative to said transfer slides.

* * * * *